J. H. LAYDEN.
TIRE TOOL.
APPLICATION FILED FEB. 7, 1920.
1,370,132.
Patented Mar. 1, 1921.
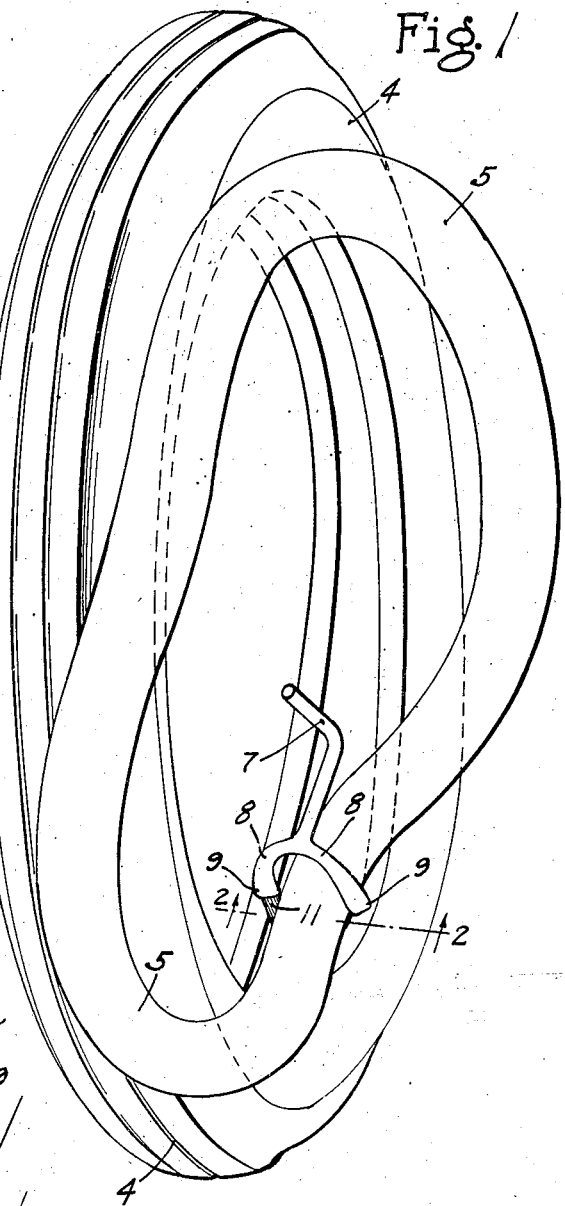
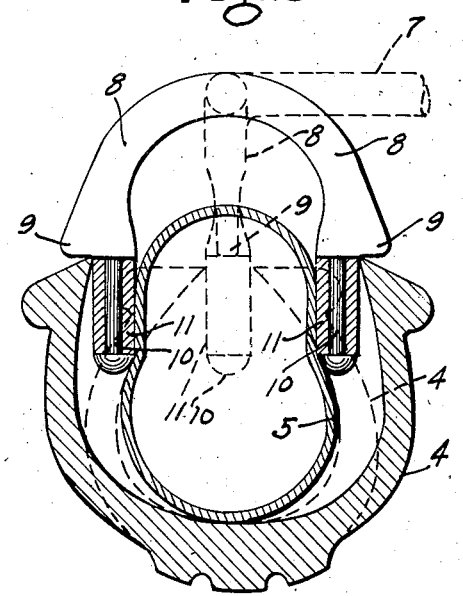
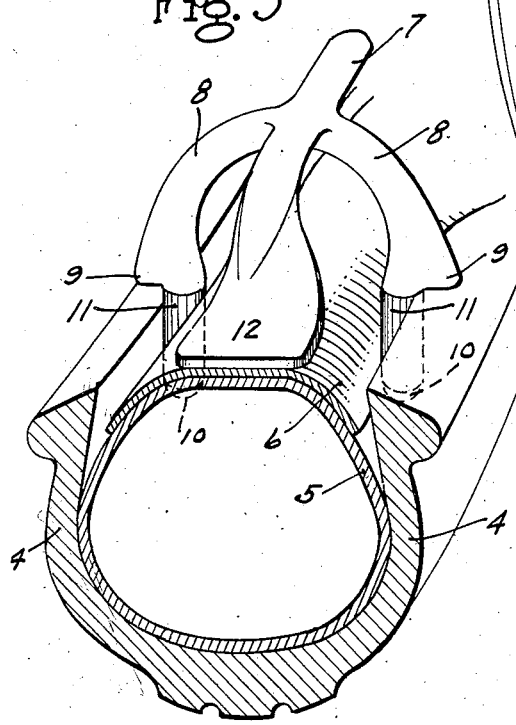
INVENTOR
JOHN H. LAYDEN
BY HIS ATTORNEYS
Williamson Merchant

UNITED STATES PATENT OFFICE.

JOHN H. LAYDEN, OF MINNEAPOLIS, MINNESOTA.

TIRE-TOOL.

1,370,132.   Specification of Letters Patent.   Patented Mar. 1, 1921.

Application filed February 7, 1920. Serial No. 356,860.

*To all whom it may concern:*

Be it known that I, JOHN H. LAYDEN, a citizen of the United States, residing at Minneapolis, in the county of Hennepin and State of Minnesota, have invented certain new and useful Improvements in Tire-Tools; and I do hereby declare the following to be a full, clear, and exact description of the invention, such as will enable others skilled in the art to which it appertains to make and use the same.

My invention has for its object to provide an extremely efficient and very simple device for opening the casings of pneumatic tires, to facilitate the placing of the inner tube within the casings, and, to such ends, the invention consists of the novel construction and combinations of parts hereinafter described and defined in the claims.

The preferred form of the device is illustrated in the accompanying drawings, wherein like characters indicate like parts throughout the several views.

Referring to the drawings:—

Figure 1 is a perspective view illustrating the use of the tire tool in applying an inner tube within a casing;

Fig. 2 is an enlarged transverse section taken approximately on the line 2—2 of Fig. 1; and Fig. 3 is a perspective view showing portions of a tire casing, an inner tube and a liner in section and showing also the tire tool with a liner-engaging tongue applied thereto.

The tire casing is indicated by the numeral 4, the inner tube by the numeral 5, and the tire liner by the numeral 6.

The tire tool shown in Figs. 1 and 2 comprises a handle 7, provided at one end with a U-shaped arch 8 with outstanding stop lugs 9, and, below said lugs, having depending parallel fingers, which latter, as shown and preferred, are made up of studs or pins 10 equipped with rollers 11. The pins or studs 10 are driven into the prongs of the arch 8, or otherwise rigidly secured thereto, so that the roller-equipped fingers, so-called, are adapted to engage the edges of the casing.

In the use of this tire tool for inserting an inner tube in a casing, said tool may be applied to the casing by first pressing a portion of the tube, which may be deflated or partly inflated, into said casing. The tool is then turned into a position indicated by dotted lines in Fig. 2, so that its roller-equipped fingers will freely enter between the edges of the tire casing, above that portion of the tube that is pressed into said casing and held below the ends of the fingers of the tool. When the tool is thus inserted, it is oscillated or turned 90 degrees, or into a position shown by full lines in Figs. 1 and 2, thereby causing the roller-equipped fingers to spread and open up the casing so that the inner tube, while lightly inflated, may be easily inserted into the casing, at that portion of the casing that is spread by the tool. The tool is then drawn forward in the casing, and, as it is drawn forward, the tube is pressed into the casing. The arch portion 8 of the tool extends entirely above the stop lugs 9, so that there is always ample room in the arch for the inner tube before it has been pressed into the casing. The lugs 9 move along on the edges of the casing and keep the tool from being inserted too far into the casing. The rollers on the spreading fingers of the tool reduce the friction between the tool and the casing, and, while desirable, are not absolutely essential.

In practice, it has been found that, in the use of this tool, inner tubes may be very quickly and easily inserted even when quite well inflated into the stiffest kind of casing.

In the form of the tool shown in Fig. 3, the arch 8 is provided with a flattened tongue 12, rigidly secured thereto and projecting therefrom in a general direction opposite to the handle 7, but having a somewhat downward inclination so that it will serve, when the tool is used as above described, to press the liner 6 into the casing and also to press down the inner tube within the casing.

What I claim is:—

1. A tire tool comprising a handle having at one end a depending arch with prongs that are in a plane to which said handle is approximately perpendicular, said prongs having stop lugs and, below said stop lugs, having depending fingers adapted to be inserted between the edges of the tire casing when said handle is turned transversely of the casing and to spread or open up the tire casing when said handle is turned approximately into the plane of the casing.

2. A tire tool comprising a handle having a depending arch at one end, said arch having outstanding stop lugs and laterally spaced fingers below said stop lugs, said stop lugs and fingers being engageable with the edges of a tire casing to spread the casing, said fingers being equipped with antifriction rollers.

3. A tire tool comprising a handle having a depending arch at one end, said arch having outstanding stop lugs and laterally spaced fingers below said stop lugs, said stop lugs and fingers being engageable with the edges of a tire casing to spread the casing, said arch having a rigidly connected tongue projecting from its upper portion slightly downward and in a general direction away from said handle.

In testimony whereof I affix my signature in presence of two witnesses.

JOHN H. LAYDEN.

Witnesses:
   EVA E. KÖNIG,
   HARRY D. KILGORE.